US006983094B2

(12) United States Patent
Mukasa

(10) Patent No.: US 6,983,094 B2
(45) Date of Patent: Jan. 3, 2006

(54) OPTICAL FIBER AND OPTICAL TRANSMISSION SYSTEM USING SUCH OPTICAL FIBER

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 221 days.

(21) Appl. No.: 10/453,893

(22) Filed: Jun. 4, 2003

(65) Prior Publication Data

US 2004/0042749 A1 Mar. 4, 2004

(30) Foreign Application Priority Data

Jun. 5, 2002 (JP) .................................... 2002-164382

(51) Int. Cl.
*G02B 6/02* (2006.01)

(52) U.S. Cl. ...................................... 385/127; 385/126

(58) Field of Classification Search ................ 385/123, 385/134, 125, 126, 127
See application file for complete search history.

(56) References Cited

U.S. PATENT DOCUMENTS 5,838,867 A * 11/1998 Onishi et al. ............... 385/123
6,181,858 B1 * 1/2001 Kato et al. .................. 385/123
6,470,126 B1 * 10/2002 Mukasa ...................... 385/123

* cited by examiner

*Primary Examiner*—Akm Enayet Ullah
*Assistant Examiner*—Jennifer Doan
(74) *Attorney, Agent, or Firm*—Eric J. Robinson; Robinson Intellectual Property Law Office, P.C.

(57) ABSTRACT

An optical fiber comprising a core and a cladding characterized by a dispersion of 0 to 17 ps/nm/km, an effective area (Aeff) of 130 $\mu m^2$ or more, a bending loss of 10 dB/m or less in a diameter of 20 mm, a dispersion slope of 0 ps/nm$^2$/km to 0.08 db/nm$^2$/km at a wavelength of 1550 nm, and a cutoff wavelength λc of a 2 m length of fiber of 1700 nm or shorter, is provided. The optical fiber and an optical transmission system of the present invention are suitable for the WDM transmission.

20 Claims, 5 Drawing Sheets

OPTICAL FIBER AND OPTICAL TRANSMISSION SYSTEM USING SUCH OPTICAL FIBER

FIELD OF THE INVENTION

The present invention is concerning an optical fiber suitable for wavelength division multiplexing (WDM) transmission and an optical transmission system using such optical fiber.

BACKGROUND OF THE INVENTION

Development of a high-speed and large capacity optical transmission is progressing, and WDM transmission attracts attention in this regard. Moreover, in the WDM transmission, a new problem of wave distortion of the signal light because of a nonlinear phenomenon occurs. It is known that it will be easy to generate a nonlinear phenomenon, for instance, Self-Phase Modulation (SPM) and Cross-Phase Modulation (XPM), etc, by higher power of the input signal light to the optical fiber.

In general, this wave distortion A NL by SPM or XPM is shown by the following expression.

$$\lambda_{NL}=(2\pi\cdot n_2\cdot Leff\cdot P)/(\lambda\cdot Aeff)$$

(Here, $n_2$ indicates a nonlinear refractive index, Leff indicates an effective length, P indicates an input optical power, λindicates a wavelength, and Aeff indicates an effective area of the optical fiber.)

Therefore, in order to suppress the occurrence of the nonlinear phenomenon such as SPM or XPM, it is effective to use the optical fiber that has large Aeff.

Single mode optical fiber (SMF), that has zero dispersion wavelength in 1.31 μm band, has a larger Aeff of about 80 $\mu m^2$ at a wavelength of 1550 nm than that of a Dispersion Shifted Fiber (DSF) that has zero dispersion wavelength in 1.55 μm band. Therefore, the nonlinear phenomenon such as SPM or XPM doesn't appear easily when SMF is used for optical transmission in 1.55 μm band. (1.55 μm band corresponds to the wavelength band of 1530–1570 nm, hereinafter.)

Moreover, because SMF have a large chromatic dispersion in the 1.55 μm band (for instance, the dispersion is 17 to 22 ps/nm/km at a wavelength of 1550 nm), it is easy to avoid Four Wave Mixing (FWM), the other nonlinear phenomena.

In addition, it provides with the advantage such as low loss and low Polarization Mode Dispersion (PMD).

On the other hand, since the dispersion is too large, the problem of wave distortion of signal light by the cumulative dispersion occurs, and which causes big hurdle in the optical transmission.

This problem can be solved by compensating the dispersion of SMF by using the negative dispersion optical fiber, which has a negative chromatic dispersion at a wavelength of 1550 nm.

For instance, U.S. Pat. No. 6,421,489 discloses the optical transmission system using a SMF as a transmission line and compensating the dispersion by a Dispersion Compensating Fiber (DCF) that has a large absolute value of a negative chromatic dispersion. This DCF is usually used in a form that is rolled like the coil and stored in a compact package, so-called the module, and is set up in the relay station etc.

Moreover, U.S. Pat. No. 6,456,770 discloses the optical transmission system using a SMF and an Inverse Dispersion Fiber (IDF) which has an almost the same absolute value as SMF and a negative chromatic dispersion, as a transmission line.

These DCF and IDF have very small Aeff compared with SMF, and hence the nonlinear phenomena appear easily, and also have the disadvantage of high loss and high PMD.

SUMMARY OF THE INVENTION

Developing higher-speed and larger capacity WDM transmission will be advanced in the future, and it is expected that signal light with higher power than before will have to be input to the optical fiber.

In case the input signal light is having higher power than before, the appearance of the nonlinear phenomena such as SPM and XPM becomes remarkable because, DCF and IDF, used for compensating the dispersion of SMF, have a large nonlinear characteristic.

To avoid this problem, it is desirable to shorten the length of the DCF or IDF as much as possible in the transmission system.

Because the length of DCF and IDF is decided so that it cancels the dispersion of SMF making the total dispersion of the optical transmission system zero, in general, if the dispersion of SMF can be reduced, the length of DCF or IDF can be shortened.

As mentioned above, the dispersion of SMF is 17 ps/nm/km or more at 1550 nm.

Therefore, if this dispersion can be controlled to 17 ps/nm/km or less, the length of DCF or IDF can be shortened, and, as a result, total transmission system having low nonlinear characteristics can be achieved.

On the other hand, in order to correspond to further high power input, a Large Aeff SMF in which the Aeff is enlarged more than SMF is proposed.

Table 1 shows the characteristics of the previously proposed Large Aeff SMF. The dispersion, dispersion slope, transmission loss, Aeff, bending loss, and PMD are the values at the wavelength 1550 nm.

Moreover, in this specification, the dispersion, dispersion slope, transmission loss, Aeff, bending loss, and PMD are the values at a wavelength of 1550 nm, when specifically not mentioned.

TABLE 1

| No. | Reflective Index Profile | Dispersion ps/nm/km | Dispersion Slope $ps/nm^2/km$ | Loss dB/km | Aeff $\mu m^2$ | λc nm | Bending Loss *) dB/m | PMD $ps/km^{1/2}$ |
|---|---|---|---|---|---|---|---|---|
| 01 | FIG. 7 (a) | 18.0 | 0.060 | 0.19 | 85 | 1500 | 3.0 | 0.05 |
| 02 | FIG. 7 (b) | 17.0 | 0.063 | 0.19 | 100 | 1550 | 10.0 | 0.05 |

TABLE 1-continued

| No. | Reflective Index Profile | Dispersion ps/nm/km | Dispersion Slope ps/nm$^2$/km | Loss dB/km | Aeff $\mu m^2$ | λc nm | Bending Loss *) dB/m | PMD ps/km$^{1/2}$ |
|---|---|---|---|---|---|---|---|---|
| 03 | FIG. 7 (b) | 14.0 | 0.069 | 0.19 | 95 | 1550 | 10.0 | 0.05 |
| 04 | FIG. 7 (c) | 20.0 | 0.062 | 0.19 | 110 | 1350 | 1.0 | 0.05 |
| 05 | FIG. 7 (c) | 22.0 | 0.065 | 0.20 | 150 | 1550 | 3.0 | 0.07 |
| 06 | FIG. 7 (d) | 12.0 | 0.070 | 0.22 | 120 | 1400 | 10.0 | 0.10 |

*) Bending Loss; in a diameter of 20 mm

These Large Aeff SMFs have the refractive index profiles shown in FIG. 7(*a*) to (*d*), and consist the core of two layers except FIG. 7(*a*).

Clearly from Table 1, the limit of the enlargement of the Aeff of most of the conventional Large Aeff SMFs is about 120 $\mu m^2$, and in case the high power signal light is input, the appearance of the nonlinear phenomenon cannot be sufficiently suppressed.

Moreover, the dispersion is 17 to 22 ps/nm/km, and almost the same as SMF. And, when Aeff increases to 150 $\mu m^2$ like No.05, the dispersion becomes large and it is not possible to simultaneously enlarge Aeff and have low dispersion in any sample.

The present invention is aimed to provide an optical fiber having a reduced dispers ion and sufficient enlargement of Aeff and a transmission system using such an optical fiber.

In detail, the optical fiber of the present invention comprises a core and a cladding, and is characterized in that, a dispersion is positive and not more than 17 ps/nm/km at a wavelength of 1550 nm, an effective area (Aeff) is 130 $\mu m^2$ or more at a wavelength of 1550 nm, a bending loss is 10 dB/m or less in a diameter of 20 mm at a wavelength of 1550 nm, a dispersion slope is positive and not more than 0.08 ps/nm$^2$/km at a wavelength of 1550 nm, and a cutoff wavelength λc of a 2 m length of fiber is 1700 nm or shorter.

Further more, in the optical fiber of the present invention, the core has at least a first core at the center, a second core surrounding the first core, and a third core surrounding the second core, and a relative refractive index difference of the first core with the cladding is not less than 0.25% and not more than 0.65%, a relative refractive index difference of the second core with the cladding is not less than –0.30% and not more than 0.10%, a relative refractive index difference of the third core with the cladding is not less than 0.25% and not more than 0.65%, a ratio of diameters of the third core to the first core is not less than 0.20 and not more than 0.40, a ratio of diameters of the third core to the second core is not less than 0.50 and not more than 0.80, and an α factor which represents the shape of refractive index profile of the first core is 2 or more.

In an another optical fibers of the present invention, a relative refractive index difference of the first core with the cladding is not less than –1.0% and not more than –0.10% (in the range of –1.0% to –0.10%), a relative refractive index difference of the second core with the cladding is not less than 0% and not more than 0.40%, a relative refractive index difference of the third core with the cladding is not less than 0.45% and not more than 0.80%, a ratio of diameters of the third core to the first core is not less than 0.20 and not more than 0.50, and a ratio of diameters of the third core to the second core is not less than 0.55 and not more than 0.80.

An optical transmission system of the present invention uses the optical fiber of the present invention at least in a part of transmission line.

DESCRIPTION OF THE PREFERRED EMBODIMENT

Figure 1:
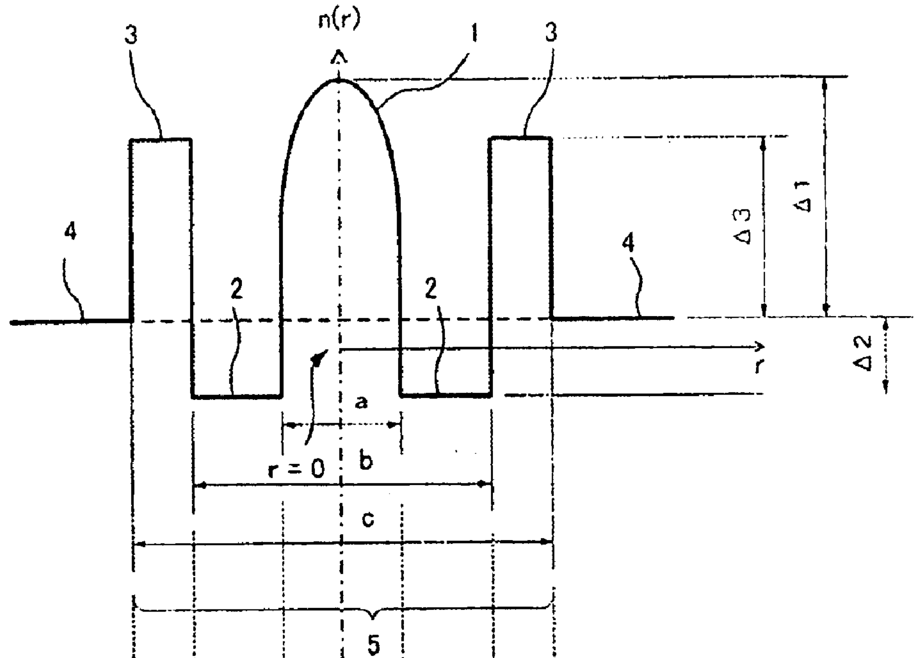
FIG. 1(*a*) and FIG. 1(*b*) show the refractive index profile and a cross-sectional view of the optical fiber A of an embodiment according to the present invention, respectively.
Figure 1:
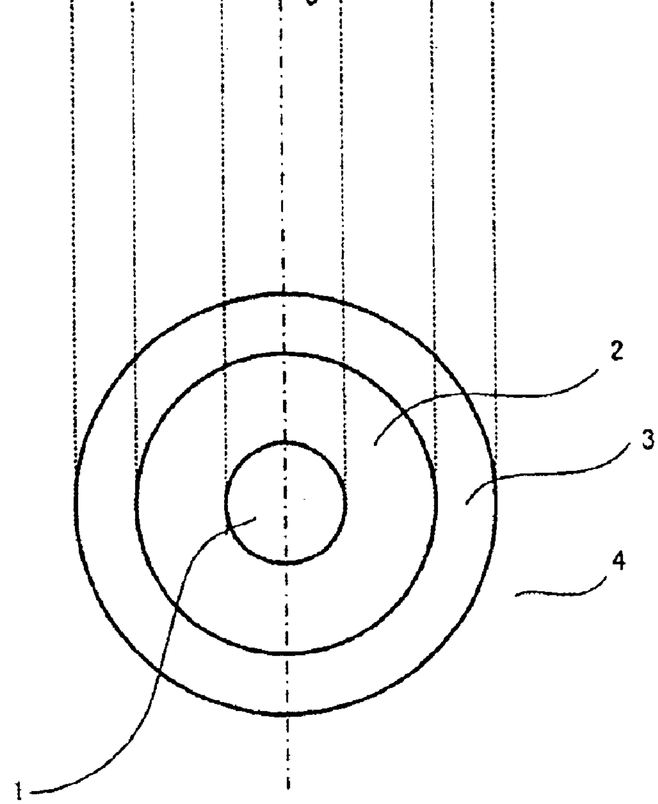

An embodiment of the present invention is explained by using the drawing as follows. Refractive index profiles and a cross-sectional views of the optical fiber of an embodiment of the present invention are shown in FIG. 1(*a*), FIG. 1(*b*), FIG. 2(*a*), and FIG. 2(*b*), respectively.

Figure 2:
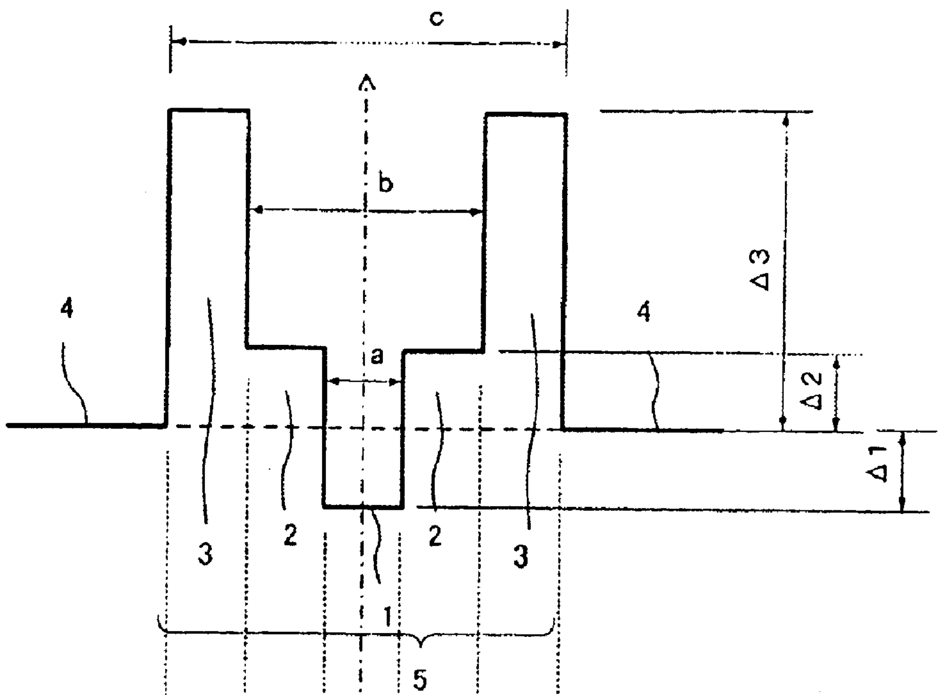
FIG. 2(*a*) and FIG. 2(*b*) show the refractive index profile and a cross-sectional view of the optical fiber B of an embodiment according to the present invention, respectively.
Figure 2:
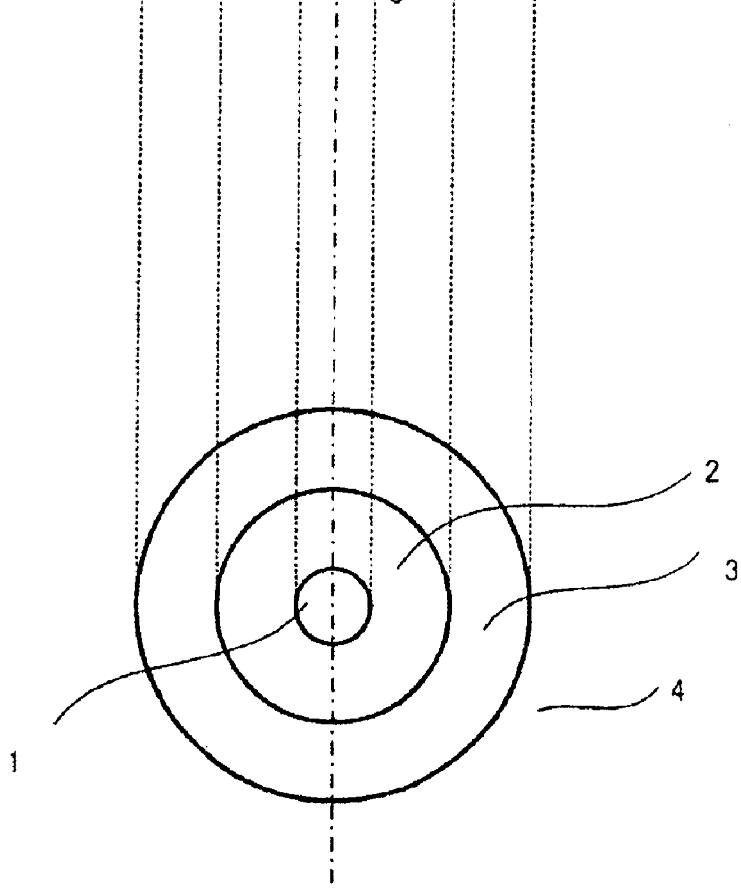

Here, the Optical fiber A has the refractive index profile shown in FIG. 1(*a*) and the Optical fiber B has the refractive index profile shown in FIG. 2(*a*).

Initially, the Optical fiber A shown in FIG. 1 is explained.

Optical fiber A possesses a cross-sectional structure as shown in FIG. 1(*b*), which has a core 5 comprising a first core 1 at the center, a second core 2 surrounding the first core 1, and a third core 3 surrounding the second core 2, and a cladding 4 surrounding the core 5.

In the refractive index profile of Optical fiber A, when the relative refractive index differences of the first core 1, the second core 2, and the third core 3 with the cladding 4 are assumed to be "Δ1", "Δ2", and "Δ3" respectively, the relation of "Δ1">"Δ3">"Δ2" or "Δ3">"Δ1">"Δ2" are satisfied. Moreover, the refractive index profile of the first core 1 is an α-profile.

In this specification, when the refractive index of the first core 1, second core 2, third core 3, and the cladding 4 are assumed to be n1, n2, n3 and n4, respectably, Δ1, Δ2, and Δ3 are defined by the following formulas of (1)–(3).

$$\Delta 1(\%)=\{(n1^2 \cdot n^4)/(2\times n4^2)\}\times 100 \quad (1)$$

$$\Delta 2(\%)=\{(n2^2-n4^2)/(2\times n4^2)\}\times 100 \quad (2)$$

$$\Delta 3\ (\%)\ \{(n3^2-n4^2)/(2\times n4^2)\}\times 100 \quad (3)$$

Moreover, α, which represents the refractive index profile of the first core 1, is defined by the following formula (4). In this formula, "r" shows the position in the radial direction of the optical fiber, n(r) shows the refractive index at the position "r", and "a" shows the diameter of the first core 1:

$$n(r)=n1\times\{1\cdot 2\times\Delta 1\ \times(2r/a)^{\alpha}\}^{1/2} \quad (4)$$

$$0\leqq r\leqq a/2$$

In addition, the diameters of the first, second and third core are assumed to be "a", "b", and "c", respectively. The ratio of the diameters of the third core 3 to the first core 1 is assumed to be "Ra1" (=a/c), and the ratio of the diameters of the third core 3 to the second core 2 is assumed to be "Ra2" (=b/c).

Moreover, the diameter "a" of the first core 1 is the diameter at the position in the first core 1 where the refractive index is half of Δ1, the diameter "b" of the second core 2 is the diameter at the position in the boundary between the second core 2 and the third core 3 where the refractive index is half of Δ2, and the diameter "c" of the third core 3 is the diameter at the position in the boundary between the third core 3 and the cladding 4 where the refractive index is one by tenth of Δ3.

By using these relative refractive index differences "Δ1", "Δ2", and "Δ3", "α" of the first core, and a ratio of diameters "Ra1" and "Ra2" as parameters, the suitable refractive index profile to satisfy a positive dispersion of not more than 17 ps/nm/km, Aeff of 130 $\mu m^2$ or more, a bending loss of 10 dB/m or less in a diameter of 20 mm, and a positive dispersion slope of not more than 0.08 $ps/nm^2/km$ at 1550 nm, and λc of 1700 nm or shorter was calculated by simulation.

Here, cutoff wavelength means the cutoff wavelength λc of a 2 m length of fiber defined by ITU-T G.650 (ITU means International Telecommunications Union). Additionally, the terms not specifically defined in this specification follow the definition and the measuring method of ITU-T G.650.

The optical fiber which satisfies the above-mentioned characteristic wherein, Aeff is sufficiently enlarged, 130 $\mu m^2$, can control a wave distortion by nonlinear phenomena such as SPM and XPM even if the input signal power is high. Moreover, since the dispersion is small, 0 to 17 ps/nm/km, when the optical fiber is combined with the DCF or IDF, the length of DCF or IDF can be shortened in the transmission system and, as a result, the nonlinear characteristic can be suppressed. Also, it is advantageous to be able to shorten the length of DCF or IDF from the point of a low loss and low PMD.

In addition, the small dispersion also has the effect that the generation of the wave distortion of the optical signal caused by the cumulative dispersion can be suppressed, enabling a more high-quality and more high-speed transmission.

Moreover, when it is assumed to connect it with DCF or IDF that has a negative chromatic dispersion at the wavelength of 1550 nm, it is desirable that the dispersion is positive and when the generation of FWM is considered, a chromatic dispersion of 2 ps/nm/km or more is more desirable.

In addition, the wavelength dependency of the cumulative dispersion can be sufficiently reduced by suitably suppressing the dispersion slope to be 0 to 0.08 $ps/nm^2/km$ for the large capacity WDM transmission. Moreover, since DCF and IDF have a negative dispersion slope at a wavelength of 1550 nm, it is desirable that the dispersion slope is positive, considering compensation of the dispersion slope.

Moreover, the single mode propagation in the 1.55 μm wavelength band is ensured by making the cutoff wavelength λc to be 1700 nm or less. Moreover, by fixing the bending loss in the diameter of 20 mm to be 10 dB/m or less, the loss increase by the micro-bending generated by making as cables is small, and it becomes an optical fiber that can be actually used.

Hereafter, an example of the procedure of the optimization of the refractive index profile is explained.

In the conventional Large Aeff SMF, which has two-layer core, it is known that the relative refractive index difference of the first core "Δ1" is an important factor that greatly controls Aeff and the dispersion.

Then, at first in case of Optical fiber A of the embodiment, the relation between the relative refractive index difference of the first core "Δ1" and the dispersion and Aeff and the relation between the relative refractive index difference of the first core "Δ1" and the cutoff wavelength and the dispersion slope are calculated. And, all calculation wavelengths were set to 1550 nm.

At this time, the bending loss in the diameter of 20 mm was set to a fixed value 5 dB/m.

Moreover, "α" is fixed to 5, the relative refractive index difference of the second core "Δ2" is fixed to the same level as cladding, that is 0%, the relative refractive index difference of the third core "Δ3" is fixed to 0.5%, "Ra1" is fixed to 0.3, and "Ra2" is fixed to 0.6, and only the relative refractive index difference of the first core "Δ1" has been changed.

Figure 3:
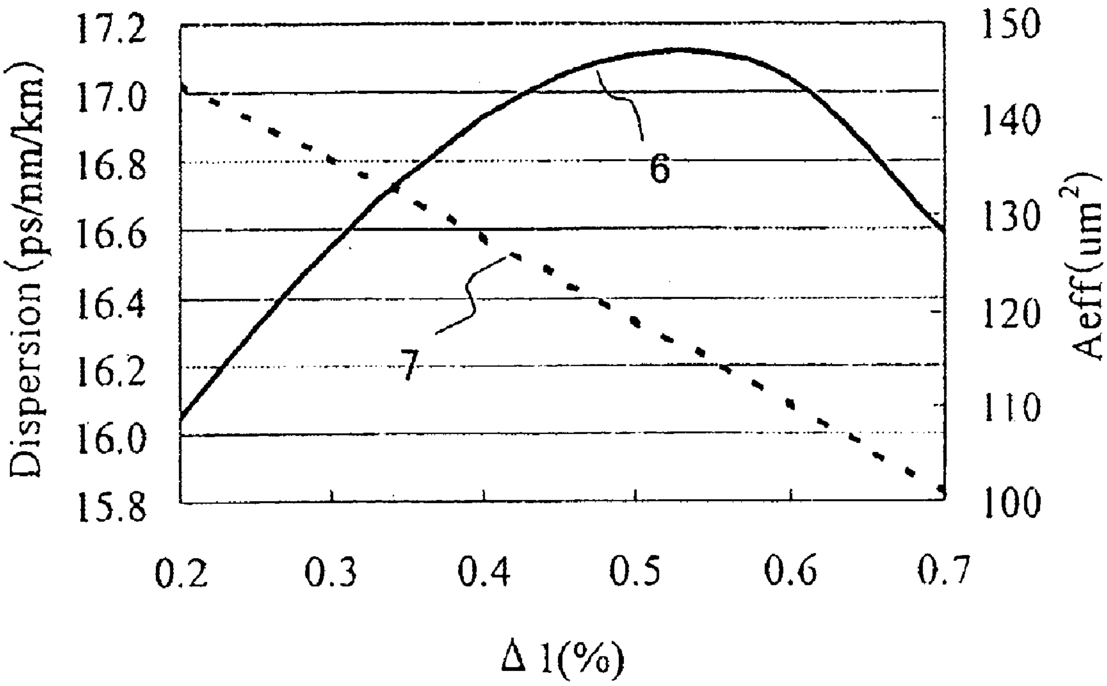
FIG. 3 is a graph, which shows an example of relationship between Δ1 and, dispersion and Aeff of the optical fiber of an embodiment according to the present invention.
Figure 4:
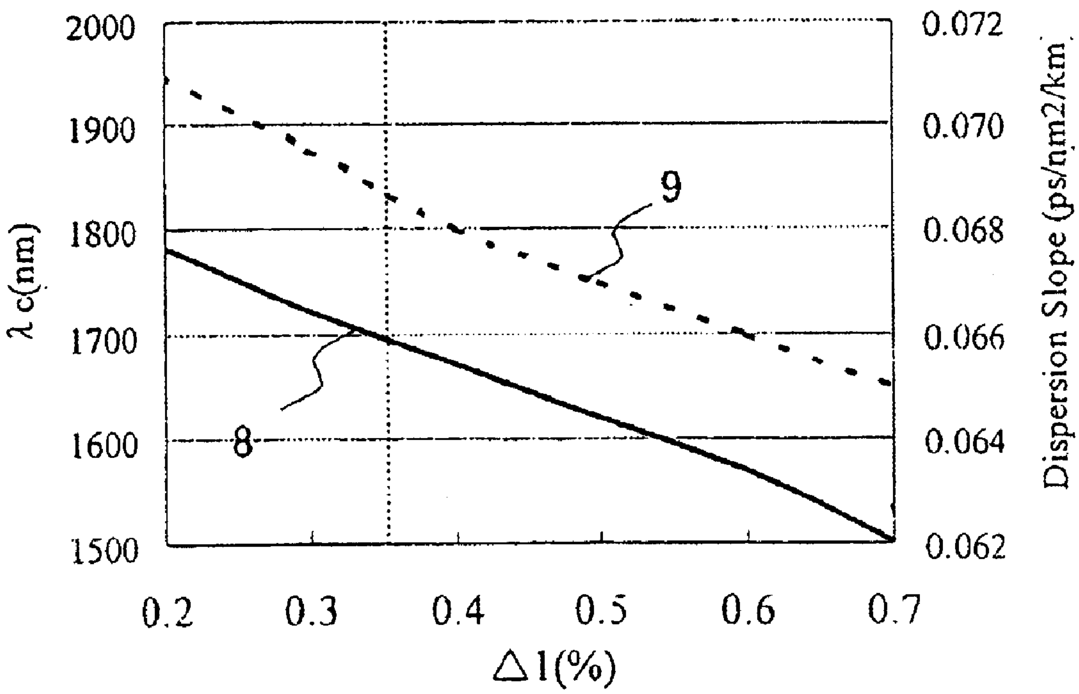
FIG. 4 is a graph, which shows an example of the relationship between Δ1 and, λc and the dispersion slope of the optical fiber of an embodiment according to the present invention.

The results of the simulation are shown in FIG. 3 and FIG. 4 respectively.

In FIG. 3, the solid line 6 shows the relationship between Δ1 and the dispersion and the broken line 7 shows the relationship between Δ1 and the Aeff. And In FIG. 4, the solid line 8 shows the relationship between Δ1 and the cutoff wavelength λc and the broken line 9 shows the relationship between Δ1 and the dispersion slope.

It is clear from FIG. 3 that the dispersion becomes maximum around Δ1=0.55%, and in both cases of reducing and increasing of Δ1 than this, the dispersion becomes small.

However, when Δ1 is increased, Aeff becomes small, and conversely, if Δ1 is reduced then Aeff is enlarged.

Therefore, in this Optical fiber A, Aeff increases if Δ1 is reduced, and at the same time the dispersion also becomes small. That is, reducing Δ1 is an effective method to achieve a low nonlinear characteristic and low dispersion. In this case, if Δ1 is 0.38% or less, it is sufficient to make the dispersion of 0 to 17 ps/nm/km and Aeff of 130 $\mu m^2$ or more.

However, on the other hand, it is clear from FIG. 4 that if Δ1 is reduced, the cutoff wavelength λc and the dispersion slope increase.

When λc becomes 1700 nm or more, ensuring the single mode propagation in the 1.55 μm wavelength band becomes difficult. It is clear from FIG. 4 that when Δ1 becomes 0.35% or less, λc increases to 1700 nm or more.

Moreover, the dispersion compensation becomes difficult because the wavelength dependency of the cumulative dispersion increases when the dispersion slope is large, and the expansion of the transmission capacity is limited. Therefore, from this viewpoint, it is desirable that the dispersion slope is small, and α1 is large.

In this case, it turns out from the above that the range of Δ1 from 0.35 to 0.38% satisfies λc to be 1700 nm or less, dispersion to be 0 to 17 ps/nm/km, and Aeff to be 130 $\mu m^2$ or more. At this time, the dispersion slope can be assumed to be 0 to 0.07 $ps/nm^2/km$.

In the same way, under the condition of keeping the bending loss to a constant 5 dB/m, the parameters Δ2, Δ3, Ra1, and Ra2 other than Δ1 were also changed, and the suitable refractive index profile was calculated by repeating the above-mentioned work. As a result, it is necessary to set Δ1 to be 0.25 to 0.65%, in order to have a dispersion of 0 to 17 ps/nm/km, Aeff of 130 $\mu m^2$ or more, λc of 1700 nm or shorter, and dispersion slope of 0 to 0.08 $ps/nm^2/km$.

That is, when Δ1 was reduced less than 0.25%, λc increased to 1700 nm or more, and when Δ1 was increased more than 0.65%, it was not possible to make Aeff to be 130 $\mu m^2$ or more, even if other factors were optimized.

The tendency of change in the values of the dispersion, dispersion slope, Aeff, and λc, when each parameter is changed, is shown in Table 2 here.

TABLE 2

| | Dispersion | Dispersion slope | Aeff | λc |
|---|---|---|---|---|
| Δ1 ↗ | ⌣ | ↘ | ⌒ | ⌣ |
| Δ2 ↗ | ↗ | ↘ | ↘ | ↗ |
| Δ3 ↗ | ↘ | ↗ | ↘ | ↗ |
| Ra1 ↗ | ↗ | ↘ | ↘ | ↘ |
| Ra2 ↗ | ↘ | ↗ | ↗ | ⌣ |
| α ↗ | ↗ | ↘ | ⌒ | ↘ |

Here, an arrow upper right means a monotone increase, an arrow lower right means a monotone decrease, and an arrow of the curve means it has the maximum or the minimum.

Based on these tendencies, Δ1 is changed within the above mentioned range and the optimal values of each parameters of Δ2, Δ3, Ra1, and Ra2 were calculated.

The results are as follows.

In the Optical fiber A, when Δ2 is reduced to −0.30% or less, the dispersion slope increases, and when Δ2 is increased 0.10% or more, the enlargement of Aeff is insufficient and the dispersion increases. Hence, it is necessary to set Δ2 to −0.30 to 0.10%.

When Δ3 is reduced to 0.25% or less, the dispersion increases, and when Δ3 is increased to 0.65% or more, the enlargement of Aeff becomes insufficient. So, it is necessary to set Δ3 to 0.25 to 0.65%.

When Ra1 is smaller than 0.2, it is difficult to ensure the single mode propagation and the dispersion slope increases, and when Ra1 is increased more than 0.4, the enlargement of Aeff becomes inadequate and the dispersion also increases. So, it is necessary to set Ra1 to 0.2 to 0.4.

When Ra2 is smaller than 0.5, the enlargement of Aeff becomes inadequate and the dispersion increases, and when Ra2 is increased more than 0.8, the dispersion slope increases. So, it is necessary to set Ra2 to 0.5 to 0.8.

Moreover, when α is two or more, it is possible to obtain excellent results.

The representative examples of the suitable refractive index profile obtained from the above-mentioned simulations are shown in Table 3.

TABLE 3

| No. | Δ1 % | α | Δ2 % | Δ3 % | Ra1 | Ra2 | Core Diameter μm | Dispersion ps/nm/km | Dispersion Slope $ps/nm^2/km$ | Aeff $\mu m^2$ | λc nm |
|---|---|---|---|---|---|---|---|---|---|---|---|
| Sample 1 | 0.50 | 6 | −0.15 | 0.52 | 0.32 | 0.62 | 10.9 | 15.4 | 0.072 | 159 | 1596 |
| Sample 2 | 0.47 | 6 | −0.15 | 0.52 | 0.28 | 0.60 | 10.7 | 14.7 | 0.073 | 156 | 1591 |
| Sample 3 | 0.50 | 8 | −0.10 | 0.50 | 0.28 | 0.60 | 10.6 | 16.0 | 0.071 | 150 | 1554 |
| Sample 4 | 0.50 | 2 | −0.15 | 0.50 | 0.30 | 0.60 | 11.0 | 14.4 | 0.074 | 175 | 1692 |

Here, the core diameter is a diameter of "c" when making it to the optical fiber. It is clear from Table 3 that in all the examples, the dispersion is 0 to 17 ps/nm/km and, at the same time, Aeff is enlarged to 130 $\mu m^2$ or more. Moreover, λc is shorter than 1700 nm, and in example 1 to 3, it is shorter than 1600 nm. Moreover, the dispersion slope is 0 to 0.08 $ps/nm^2/km$, and these optical fibers are suitable for WDM transmission.

Next, Optical fiber B shown in FIG. 2 is explained.

Optical fiber B has a cross-sectional structure as shown in FIG. 2(*b*), which has three-layer core 5, and a cladding 4 surrounding the core 5.

In this profile, the relative refractive index differences of the first core 1, the second core 2, and the third core 3 with the cladding 4, "Δ1", "Δ2", and "Δ3" satisfy the relation of "Δ3">"Δ2">"Δ1".

Here, "Δ1", "Δ2", and "Δ3", diameters of each core "a", "b", and "c", and ratios of core diameters "Ra1" and "Ra2" are defined as in the case of Optical fiber A.

Moreover, the diameter "a" of the first core 1 is the diameter at the position in the first core 1 where the refractive index is half of Δ1, the diameter "b" of the second core 2 is the diameter at the position in the boundary between the second core 2 and the third core 3 where the refractive index is half of Δ3–Δ2, and the diameter "c" of the third core 3 is the diameter at the position in the boundary between the third core 3 and the cladding 4 where the refractive index is one by tenth of Δ3.

Also in the case of Optical fiber B, "Δ1", "Δ2", and "Δ3", and a ratio of diameters "Ra1" and "Ra2" are used as parameters and the suitable refractive index profile to satisfy a positive dispersion of not more than 17 ps/nm/km, Aeff of 130 $\mu m^2$ or more, a bending loss of 10 dB/m or less in a diameter of 20 mm, and a dispersion slope of 0 to 0.08 $ps/nm^2/km$ at 1550 nm, and λc of 1700 nm or shorter was calculated by the simulation.

As a result, it was necessary to set Δ1 as −1.0 to 0.10%, Δ2 as 0 to 0.40%, and Δ3 as 0.45 to 0.80% and Ra1 as 0.20 to 0.50 and Ra2 as 0.55 to 0.80.

Here, the tendency of change in the value of the dispersion, dispersion slope, Aeff, and λc when each param eter is changed, under the condition of keeping the bending loss 5 dB/m, is shown in Table 4.

TABLE 4

| | | Dispersion | Dispersion slope | Aeff | λc |
|---|---|---|---|---|---|
| Δ1 | ↗ | ↗ | ⤴ | ↘ | ↘ |
| Δ2 | ↗ | ⤴ | ↗ | ↘ | ↘ |
| Δ3 | ↗ | ↘ | ↗ | ↘ | ↘ |
| Ra1 | ↗ | ↘ | ↗ | ↗ | ↗ |
| Ra2 | ↗ | ↗ | ⤴ | ↘ | ↘ |

Here, the meaning of each arrow is the same as in Table 2.

Moreover, the representative examples of the suitable refractive index profile obtained from the above-mentioned simulation results are shown in Table 5.

As clear from Table 6, Aeff of the optical fiber of example 1 to 3 are all 130 $\mu m^2$ or more, and a wave distortion caused by nonlinear phenomena such as SPM and XPM can be adequately suppressed. Moreover, since the dispersion is also smaller than SMF, when the optical fiber is combined with the DCF or IDF, the length of DCF or IDF can be shortened in the transmission system and, as a result, a nonlinear characteristic can be suppressed. Moreover, the generation of the wave distortion of the optical signal caused by the cumulative dispersion can be controlled, and FWM also can be controlled because the dispersion is large enough.

In addition, the dispersion slope is about 0.07 ps/nm$^2$/km, the wavelength dependency of the cumulative dispersion is sufficiently small and suitable for a large capacity WDM transmission. The cutoff wavelength λc of every optical fiber of example 1 to 3 is 1600 nm or shorter. When the cable cutoff wavelength λcc of a 22 m length of these optical fibers was measured, all of them were 1400 nm or shorter. Therefore, in the optical fibers of the examples, single mode propagation is ensured in the wavelength of 1400 nm or more.

The optical fibers of the examples have the transmission loss of 0.20 dB/km or less and PMD of 0.1 ps/$\sqrt[4]{}$km or less at a wavelength of 1550 nm. Moreover, the bending loss is small and hence these optical fibers of the examples are not only experimental ones but can be actually used.

TABLE 5

| No. | Δ1 % | Δ2 % | Δ3 % | Ra1 | Ra2 | Core Diameter μm | Dispersion ps/nm/km | Dispersion Slope ps/nm$^2$/km | Aeff μm$^2$ | λc nm |
|---|---|---|---|---|---|---|---|---|---|---|
| Sample 5 | −0.40 | 0.10 | 0.60 | 0.36 | 0.65 | 9.8 | 11.6 | 0.073 | 139 | 1560 |
| Sample 6 | −0.30 | 0.10 | 0.60 | 0.40 | 0.63 | 10.2 | 11.2 | 0.074 | 143 | 1579 |
| Sample 7 | −0.80 | 0.15 | 0.60 | 0.41 | 0.64 | 9.9 | 8.4 | 0.072 | 143 | 1596 |
| Sample 8 | −0.90 | 0.15 | 0.60 | 0.34 | 0.62 | 10.2 | 9:.7 | 0.071 | 142 | 1594 |

The core diameter is a diameter of "c" when making it to the optical fiber.

It is clear from Table 5, though Aeff of Optical fiber B is slightly smaller than Optical fiber A, the dispersion of Optical fiber B, 8 to 12 ps/nm/km, is further smaller than the dispersion of Optical fiber A.

EXAMPLES 1 TO 3

(Optical Fiber A)

Optical fiber A shown in FIG. 1 were manufactured. The manufacturing target assumed were that of example 1 to 3 of Table 3, and almost the same refractive index profile as the target were obtained. Table 6 shows the characteristic of these optical fibers. All the measurement wavelength of each characteristic was set to 1550 nm.

EXAMPLES 5 TO 7

(Optical Fiber B)

In the same way, Optical fiber B shown in FIG. 2 was manufactured. The manufacturing target assumed were that of example 5 to 7 of Table 5, and almost the same refractive index profile as the target were obtained. Table 7 shows the characteristic of these optical fibers. All the measurement wavelength of each characteristic was set to 1550 nm.

TABLE 6

| | Reflective Index Profile | | | | | | | Characteristics | | | | | | |
|---|---|---|---|---|---|---|---|---|---|---|---|---|---|---|
| | Δ1 % | α | Δ2 % | Δ3 % | Ra1 | Ra2 | Core Diameter μm | Loss dB/km | Dispersion ps/nm/km | Dispersion Slope ps/nm$^2$/km | Aeff μm$^2$ | Bending Loss* dB/m | λc nm | PMD ps/km$^{1/2}$ |
| Sample 1 | 0.50 | 6 | −0.15 | 0.52 | 0.32 | 0.62 | 10.9 | 0.196 | 15.5 | 0.071 | 158 | 5.4 | 1568 | 0.06 |
| Sample 2 | 0.47 | 6 | −0.15 | 0.52 | 0.28 | 0.60 | 10.7 | 0.196 | 14.3 | 0.072 | 152 | 4.5 | 1575 | 0.05 |
| Sample 3 | 0.50 | 8 | −0.10 | 0.50 | 0.28 | 0.60 | 10.6 | 0.192 | 16.1 | 0.069 | 149 | 4.3 | 1549 | 0.05 |

*Bending Loss; in a diameter of 20 mm

TABLE 7

| | Reflective Index Profile | | | | | | | Characteristics | | | | | | |
|---|---|---|---|---|---|---|---|---|---|---|---|---|---|---|
| | Δ1 % | Δ2 % | Δ3 % | Ra1 | Ra2 | Core Diameter μm | Loss dB/km | Dispersion ps/nm/km | Dispersion Slope ps/nm²/km | Aeff μm² | Bending Loss* dB/m | λc nm | PMD ps/km^1/2 |
| Sample 5 | −0.40 | 0.10 | 0.60 | 0.36 | 0.65 | 9.8 | 0.235 | 11.5 | 0.072 | 140 | 5.9 | 1568 | 0.08 |
| Sample 6 | −0.30 | 0.10 | 0.60 | 0.40 | 0.63 | 10.2 | 0.226 | 11.3 | 0.074 | 144 | 5.5 | 1588 | 0.06 |
| Sample 7 | −0.80 | 0.15 | 0.60 | 0.41 | 0.64 | 9.9 | 0.238 | 9.0 | 0.072 | 145 | 6.1 | 1591 | 0.08 |

*Bending Loss; in a diameter of 20 mm

As clear from Table 7, all optical fibers of examples 5 to 7 have the Aeff of 130 $\mu m^2$ or more, similar to examples 1 to 3.

Moreover, because the dispersion has become further smaller compared with the optical fiber of example 1 to 3, the length of DCF or IDF can be made shorter, and an entire transmission system with further lower nonlinear characteristic can be achieved. Moreover, the generation of the wave distortion of the optical signal caused by the cumulative dispersion can be controlled well, and also FWM can be controlled.

In addition, the dispersion slope was about 0.07 ps/nm²/km, the cutoff wavelength λc was 1600 nm or shorter, and the cable cutoff wavelength λcc was 1400 nm or shorter.

Moreover, the optical fibers of the examples have the transmission loss of 0.25 dB/km or less and PMD of 0.1 ps/$\sqrt{km}$ or less at a wavelength of 1550 nm, and have small bending loss and hence can be actually used as in the case of the optical fibers of examples 1 to 3.

EXAMPLE (Optical Transmission System)

Some embodiments of the optical transmission system of the present invention are explained by using the drawing as follows.

A nonlinear phenomenon appears remarkably in general in the part where optical power is strong. Therefore, in the optical transmission system, the method of arranging the Large Aeff SMF just behind an optical amplifier, to control a nonlinear phenomenon of DCF or IDF, followed by the DCF or IDF is generally employed.

Figure 5:
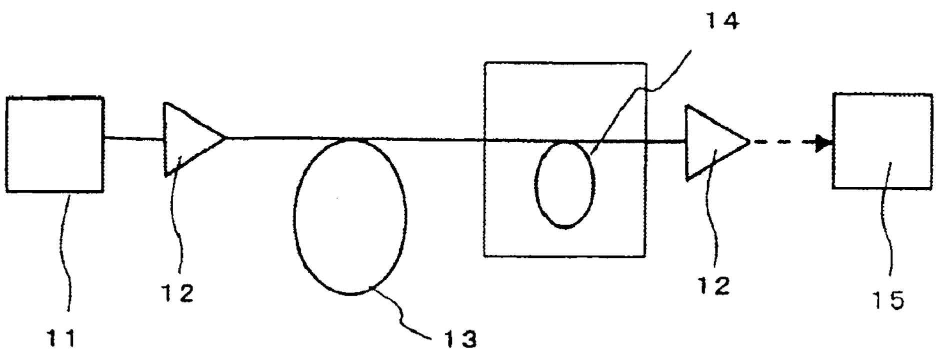
FIG. 5 is a schematic sectional view that shows the optical transmission system of an embodiment according to the present invention.

FIG. 5 is a schematic sectional view that shows the optical transmission system of an embodiment according to the present invention, and an example that the optical fiber of the present invention is used as a transmission line and the dispersion is compensated by DCF in the module form.

The signal input from Transmitter 11 is amplified with amplifier 12, and transmitted with optical fiber 13 of the present invention. Afterwards, the dispersion is compensated by DCF14 in the module form, and it is received in Receiver 15.

Figure 6:
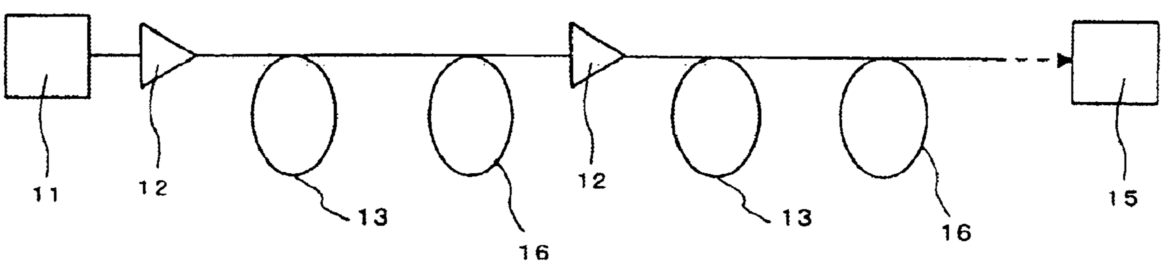
FIG. 6 is another schematic sectional view that shows the optical transmission system of an embodiment according to the present invention.
Figure 7:
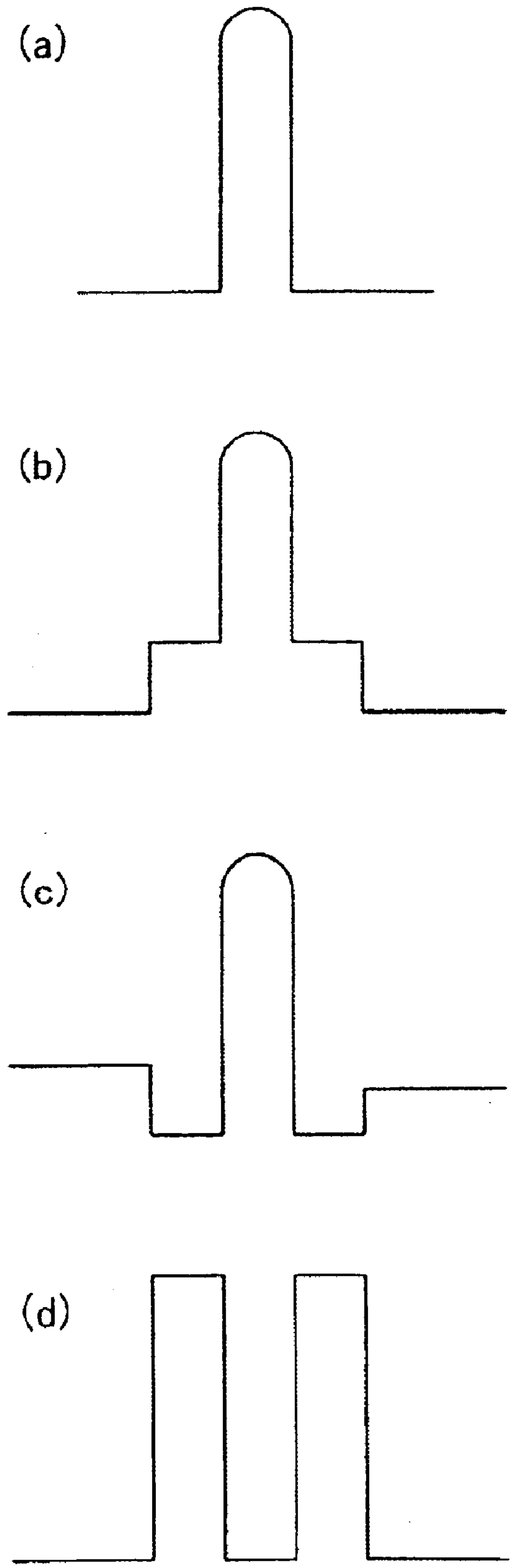
FIGS. 7(*a*), (*b*), (*c*), and (*d*) show the refractive index profiles of conventional Large Aeff SMFs.

FIG. 6 is another schematic sectional view that shows the optical transmission system of an embodiment according to the present invention, and the example that composes the transmission line of the optical fiber of the present invention and IDF.

The signal input from Transmitter 11 is amplified with amplifier 12, and transmitted with optical fiber 13 of the present invention. Next, it is transmitted with IDF16 and at the same time the dispersion is compensated. When it is transmitted over long distance, this is being repeated several times, and it is received in Receiver 15 at the end.

In the optical transmission system of the embodiment, by using the optical fiber of the present invention as a transmission line, it can have low nonlinear characteristic in which the appearance of nonlinear phenomena such as SPM, XPM, and FWM is controlled and, in addition, a low dispersion slope, a low bending loss, a low loss, and a low PMD be achieved.

The optical transmission system of the embodiment is suitable for the high-speed and large capacity WDM transmission system.

The present invention is not limited in the form of the above-mentioned embodiments.

For instance, if a required characteristic is satisfied, the optical fiber of the present invention may have the composition and the refractive index profiles other than shown in the embodiment.

Moreover, we can use the negative dispersion optical fiber other than DCF or IDF, and the optical transmission system can be composed without the negative dispersion optical fiber.

Additionally, the various changes in the range in which it doesn't deviate from the summary of this invention are possible.

As mentioned above, the optical fiber of the present invention is a Large Aeff SMF that combines low nonlinear characteristic to the low dispersion.

Since, Aeff is very large compared with the conventional SMF, the optical fiber of the present invention can decrease the dispersion suppressing the generation of a nonlinear phenomenon such as SPM and XPM, etc. even when the high power signal light is input.

Moreover, since the dispersion is small when the optical fiber is combined with the DCF or IDF, the length of DCF or IDF can be shortened in the transmission system. As a result, a nonlinear characteristic can be suppressed in the entire optical transmission system. In addition, the generation of the wave distortion of the optical signal caused by the cumulative dispersion can be suppressed.

Moreover, the optical fiber of the present invention also has the low loss and low PMD, and hence the optical transmission system, which uses the optical fiber of the present invention as an optical transmission line, is suitable for the high-speed and large capacity WDM transmission, and its industrial value is extremely large.

What is claimed is:

1. An optical fiber comprising a core and a cladding characterized by:

- a positive dispersion of not more than 17 ps/nm/km at a wavelength of 1550 nm,
- an effective area (Aeff) of 130 $\mu m^2$ or more at a wavelength of 1550 nm,
- a bending loss of 10 dB/m or less in a diameter of 20 mm at a wavelength of 1550 nm,
- a positive dispersion slope of not more than 0.08 ps/nm²/km at a wavelength of 1550 nm, and
- a cutoff wavelength λc of a 2 m length of fiber defined by ITU-TG.650 of 1700 nm or shorter.

2. The optical fiber according to claim 1, wherein:

a PMD (Polarization Mode Dispersion) is 0.10 ps/√km or less at a wavelength of 1550 nm.

3. The optical fiber according to claim 1, wherein:

the cutoff wavelength λc is 1600 nm or shorter.

4. The optical fiber according to claim further comprising:

the core comprising at least a first core at the center, a second core surrounding said first core, and a third core surrounding said second core, wherein, a relative refractive index difference of said first core with said cladding is not less than 0.25% and not more than 0.65%, a relative refractive index difference of said second core with said cladding is not less than −0.30% and not more than 0.10%, a relative refractive index difference of said third core with said cladding is not less than 0.25% and not more than 0.65%, a ratio of the diameters of said third core to said first core is not less than 0.20 and not more than 0.40, a ratio of diameters of said third core to said second core is not less than 0.50 and not more than 0.80, and a factor α, which represents the shape of the refractive index profile of said first core, is 2 or more.

5. The optical fiber according to claim 4, wherein:

a diameter of said third core is not less than 8.0 μm and not more than 13.0 μm.

6. The optical fiber according to claim 4, wherein:

an effective area (Aeff) is 145 $\mu m^2$ or more at a wavelength of 1550 nm.

7. The optical fiber according to claim 4, wherein:

a transmission loss is 0.20 dB/km or less at a wavelength of 1550 nm.

8. An optical transmission system using the optical fiber of claim 4 at least in a part of transmission line.

9. The optical transmission system according to claim 8, wherein:

an optical fiber having a negative dispersion at a wavelength of 1550 nm is used at least as a part of said transmission system.

10. The optical transmission system according to claim 9, wherein:

the optical fiber having a negative dispersion at a wavelength of 1550 nm is in the form of a module.

11. The optical transmission system according to claim 9, wherein:

the optical fiber having a negative dispersion at a wavelength of 1550 nm is used as a transmission line.

12. The optical fiber according to claim 1, further comprising:

the core comprising a first core at the center, a second core surrounding said first core, and a third core surrounding said second core, wherein, a relative refractive index difference of said first core with said cladding is not less than −1.0% and not more than −0.10%, a relative refractive index difference of said second core with said cladding is not less than 0% and not more than 0.40%, a relative refractive index difference of said third core with said cladding is not less than 0.45% and not more than 0.80%, a ratio of diameters of said third core to said first core is not less than 0.20 and not more than 0.50, and a ratio of diameters of said third core to said second core is not less than 0.55 and not more than 0.80.

13. The optical fiber according to claim 12, wherein:

a diameter of said third core is not less than 8.0 μm and not more than 13.0 μm.

14. The optical fiber according to claim 12, wherein:

a dispersion is positive and not more than 12 ps/nm/km at a wavelength of 1550 nm.

15. The optical fiber according to claim 12, wherein:

an effective area (Aeff) is 140 $\mu m^2$ or more at a wavelength of 1550 nm.

16. The optical fiber according to claim 12, wherein:

a transmission loss is 0.25 dB/km or less at a wavelength of 1550 nm.

17. An optical transmission system using the optical fiber of claim 12 at least in a part of transmission line.

18. The optical transmission system according to claim 17, wherein:

an optical fiber having a negative dispersion at a wavelength of 1550 nm is used at least as a part of said transmission system.

19. The optical transmission system according to claim 18, wherein:

the optical fiber having a negative dispersion at a wavelength of 1550 nm is in the form of a module.

20. The optical transmission system according to claim 18, wherein:

the optical fiber having a negative dispersion at a wavelength of 1550 nm is used as a transmission line.

* * * * *